United States Patent [19]

Nakanishi

[11] Patent Number: 5,088,655
[45] Date of Patent: Feb. 18, 1992

[54] CASSETTE LOADING DEVICE

[75] Inventor: Yasuyuki Nakanishi, Hyogo, Japan

[73] Assignee: Mitsubishi Denki Kabushiki Kaisha, Tokyo, Japan

[21] Appl. No.: 507,127

[22] Filed: Apr. 10, 1990

[30] Foreign Application Priority Data

Apr. 11, 1989 [JP] Japan .................................. 1-89754
May 15, 1989 [JP] Japan ................................. 1-118751

[51] Int. Cl.$^5$ ............................................. G11B 23/00
[52] U.S. Cl. ................................... 242/198; 360/96.5
[58] Field of Search ...................... 242/198, 199, 200; 360/96.1, 96.5, 96.6, 93

[56] References Cited

U.S. PATENT DOCUMENTS

| | | | |
|---|---|---|---|
| 3,977,624 | 8/1976 | Leifer et al. | 242/198 |
| 4,628,382 | 12/1986 | Okamura | 360/96.5 X |
| 4,672,485 | 6/1987 | Takahasi | 242/198 X |
| 4,792,872 | 12/1988 | Nakanishi et al. | 360/96.5 |
| 4,831,472 | 5/1989 | Ando et al. | 360/96.5 |
| 4,866,551 | 9/1989 | Kishinoto et al. | 360/96.5 |
| 4,868,924 | 9/1989 | Ando et al. | 360/96.5 |

FOREIGN PATENT DOCUMENTS

63-130939 8/1988 Japan .

*Primary Examiner*—Daniel P. Stodola
*Assistant Examiner*—John P. Darling
*Attorney, Agent, or Firm*—Burns, Doane, Swecker & Mathis

[57] ABSTRACT

A cassette loading device which can achieve sufficient miniaturization of a tape recorder. The cassette loading device comprises a frame, a cassette holder mounted on the frame for removably receiving a cassette thereon and carrying the received cassette between a cassette receiving position and a cassette playing position, a slide lever mounted for engaging, when the cassette holder is in the cassette receiving position, with the cassette received on the cassette holder to resiliently urge the cassette to move out of the cassette holder, and a slide plate mounted between the slide lever and the frame for movement with respect to the frame and the slide lever for guiding the slide lever in movement. The slide plate serves part of a guide for the movement of the slide lever and reduces the distance over which the frame guides the slide lever.

3 Claims, 7 Drawing Sheets

CASSETTE LOADING DEVICE

BACKGROUND OF THE INVENTION

1. Field of the Invention

This invention relates to a cassette loading device including a cassette holder provided in a frame for removably receiving a cassette therein and carrying the cassette between a cassette receiving position and a cassette playing position.

2. Description of the Prior Art

A cassette loading device of the type mentioned is already known, and an exemplary one of such conventional cassette loading devices is shown in FIGS. 8a to 8d. In particular, referring to FIGS. 8a to 8d, a digital audio tape recorder (DAT) in which a conventional cassette loading device is incorporated is shown at different stages of operation. The digital audio tape recorder shown includes a cassette holder 62 for removably receiving therein a cassette 61 in which a magnetic tape not shown is accommodated and carrying the cassette 61 between a cassette receiving position and a cassette playing position, a slide lever 63 for engaging with an end portion of the cassette 61 to be moved by the cassette 61, a frame 64 for guiding the slide lever 63 in movement by way of a guide pin not shown thereon, and a deck base 66 having a capstan motor not shown, a tape reel not shown and so forth mounted on an upper face thereof.

Figure 8A:
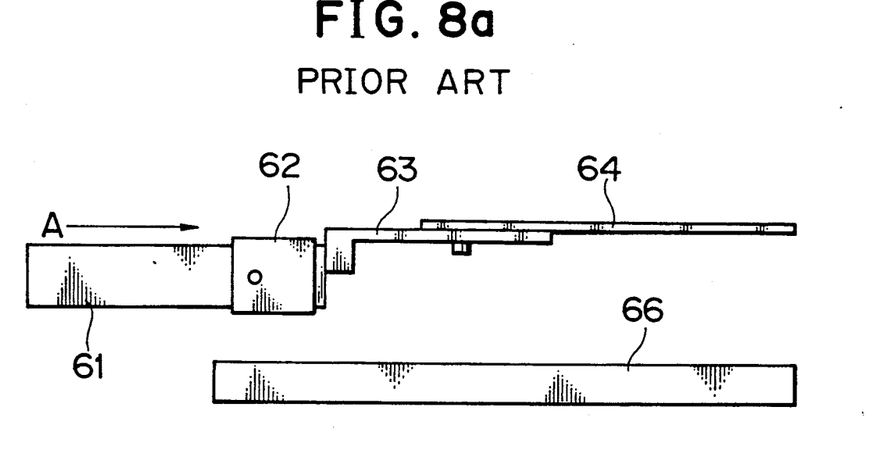
FIGS. 8a, 8b, 8c and 8d are schematic views showing a cassette holder at different positions in a conventional digital audio tape recorder.
Figure 8B:
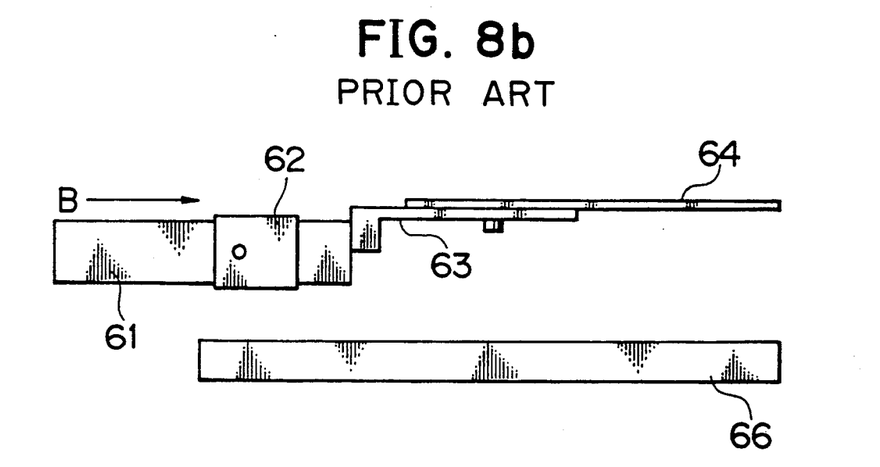
Figure 8C:
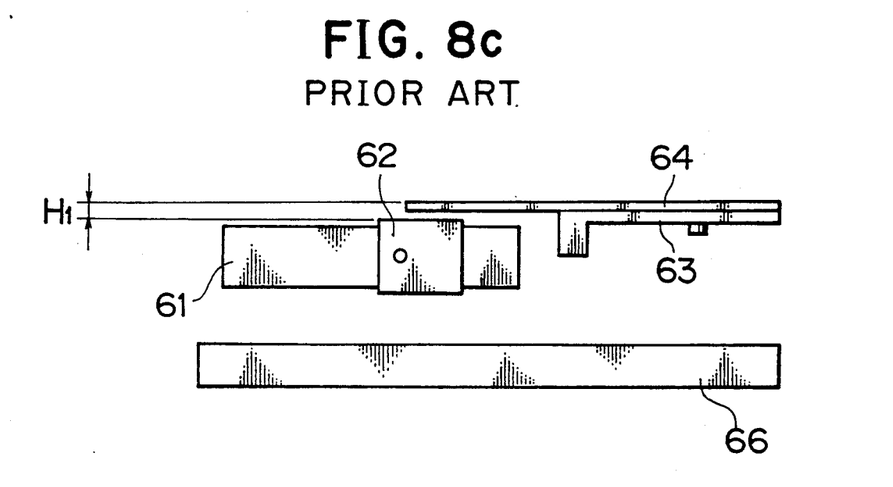

In loading operation of a cassette 61 into the digital audio tape recorder, at first the cassette 61 is manually inserted into the cassette holder 62 until it is engaged with an end portion of the slide lever 63 and held in position in the cassette holder 62 as shown in FIG. 8a. Then, the cassette 61 is manually pushed in the direction indicated by an arrow mark A in FIG. 8a with a force higher than the force with which the cassette 61 has been inserted. Thereupon, the slide lever 63 is moved by the cassette 61 in the same direction under the guidance of the frame 64 as seen in FIG. 8b so that it operates a start switch not shown. In response to such operation of the start switch, a cassette holder actuating mechanism not shown is driven to move the cassette holder 62 in the direction indicated by an arrow mark B together with the cassette 61. After the cassette holder 62 comes to a predetermined position, the slide lever 63 is spaced away from the cassette 61 and further moved under the guidance of the frame 64 as seen in FIG. 8c by an action of a center over spring not shown. After then, the cassette holder 62 is moved down to integrally move the cassette 61 to a predetermined playing position as shown in FIG. 8d.

Figure 8D:
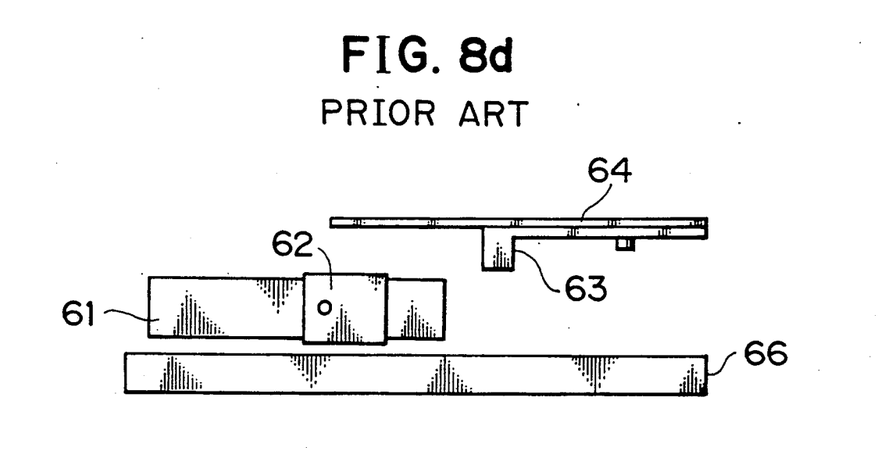

When the cassette 61 is to move reversely from the playing position shown in FIG. 8d to the receiving position shown in FIG. 8a, the cassette 61, cassette holder 62 and slide lever 63 operate in the individually reverse directions.

With such a conventional digital audio tape recorder as described above, in order to prevent the cassette holder 62 from colliding with the frame 64 which guides the slide lever 63 when the cassette holder 62 is moved between the cassette receiving position and the cassette playing position, a clearance dimension $H_1$ must be provided between the cassette holder 62 and the frame 64 as seen in FIG. 8c, which increases the overall vertical dimension of the digital audio tape recorder as much. Besides, the length of the frame 64 which guides the slide lever 63 in movement must necessarily be at least greater than a distance over which the slide lever 63 is moved, which increases the depthwise dimension of the digital audio tape recorder as much. Accordingly, the conventional digital audio tape recorder is disadvantageous in that miniaturization thereof cannot be achieved sufficiently.

SUMMARY OF THE INVENTION

It is an object of the present invention to provide a cassette loading device which can achieve sufficient miniaturization of a tape recorder.

It is another object of the present invention to provide a cassette loading device which prevents possible interference between a component thereof and a cassette to assure normal cassette loading operation.

In order to attain the objects, according to the present invention, there is provided a cassette loading device which comprises a frame, a cassette holder mounted on the frame for removably receiving a cassette thereon and carrying the received cassette between a cassette receiving position and a cassette playing position, a slide lever mounted for engaging, when the cassette holder is in the cassette receiving position, with the cassette received on the cassette holder to resiliently urge the cassette to move out of the cassette holder, and a slide plate mounted between the slide lever and the frame for movement with respect to the frame and the slide lever for guiding the slide lever in movement.

With the cassette loading device, since the slide plate is interposed for movement between the frame and the slide lever, it serves part of a guide for the movement of the slide lever. Consequently, the distance over which the frame guides the slide lever is reduced as much, which can reduce the depthwise dimension of an apparatus in which the cassette loading device is incorporated. Further, possible interference, for example, between the holder and the frame is prevented, which makes it possible to dispose a deck base at a nearer position to the frame and hence reduce the height of the apparatus. Accordingly, miniaturization of the entire apparatus can be attained. Besides, a spacing below the deck base provided by disposing the deck base at the nearer position to the frame can be utilized for the mounting of a circuit board for electric parts, for example, of a radio set to increase functions of the apparatus.

Preferably, the slide lever has resiliently engaging means provided thereon for resiliently engaging with the slide plate upon movement of the slide lever when the cassette moves from the cassette receiving position to the cassette playing position. The resiliently engaging means of the slide lever may include a pair of resilient fingers for resiliently engaging with the opposite side edges or faces of the slide plate upon movement of the slide lever. Such resiliently engaging means on the slide lever is effective to prevent possible interference between the cassette and the slide plate and hence assures a normal cassette loading operation.

The above and other features and advantages of the invention and the manner of realizing them will become more apparent, and the invention itself will best be understood, from a study of the following description and appended claims, with reference had to the attached drawings showing a some preferred embodiment of the invention.

DESCRIPTION OF THE PREFERRED EMBODIMENT

Figure 1:
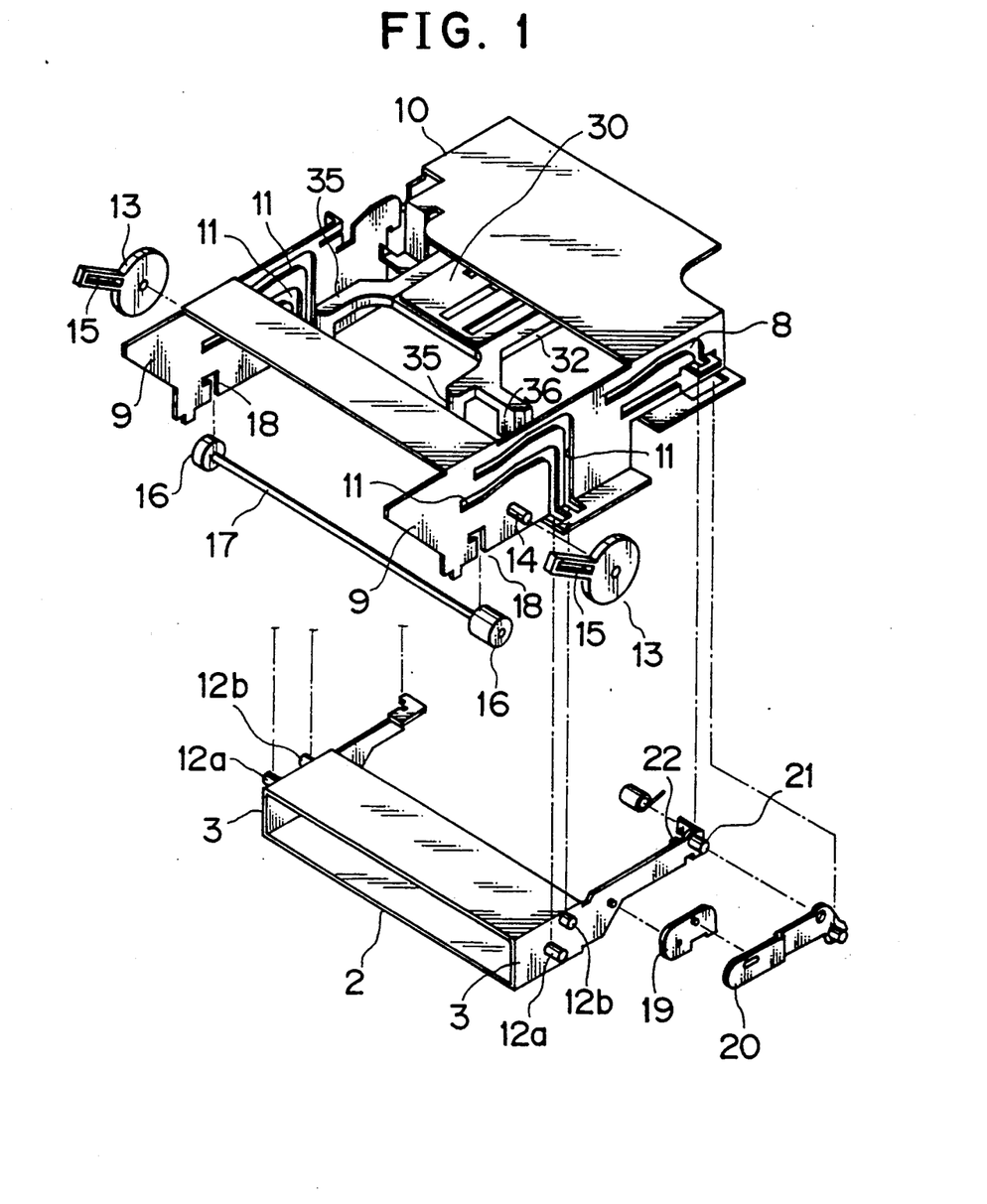
FIG. 1 is a fragmentary perspective view of part of a digital audio tape recorder in which a cassette loading device according to the present invention is incorporated.

Referring first to FIG. 1, there is shown a digital audio tape recorder in which a cassette loading device according to the present invention is incorporated. The digital audio tape recorder shown includes a frame 10 having an inverted channel-shaped cross section and mounted on a deck base 6 (refer to FIG. 3a). The frame 10 has a pair of depending side walls 9 each of which has a substantially parallel L-shaped guideways 11 formed therein. A pair of guide pins 12a and 12b are mounted on each of a pair of side walls 3 of a cassette holder 2 and fitted for sliding movement in and along the guideways 11 of the corresponding side wall 9 of the frame 10. An arm gear 13 is supported for rotation on each of the side walls 9 of the frame 10 by means of a shaft 14. The arm gear 13 has a radial guideway 15 formed therein, and the guide pins 12a and 12b on the corresponding wall 3 of the cassette holder 2 extend through the guideway 15 so that the cassette holder 2 may be moved by rotation of the arm gears 13. A synchronizing gear 16 is normally held in meshing engagement with each of the arm gears 13 for driving the arm gear 13, and the synchronizing gears 16 are securely mounted at the opposite ends of a synchronizing shaft 17 which is supported adjacent the synchronizing gears 16 thereon in a pair of L-shaped slots 18 formed in the opposite side walls 9 of the frame 10. An opener 19 is supported for pivotal motion on one of the side walls 3 of the cassette holder 2, and a link lever 20 is supported for pivotal motion on the same side wall 3 by means of a guide pin 21 and connected to the opener 19 by way of a pin-and-slot connection. A first arresting tab 22 extends from the same side wall 3 of the cassette holder 2 but in the opposite direction to the guide pin 21. The guide pin 21 is fitted for sliding movement in and along a further L-shaped guideway 8 formed in the corresponding side wall 9 of the frame 10. Thus, the cassette holder 2 can move horizontally and vertically with respect to the frame 10 under the guidance of the guide pins 12a, 12b and 21 on the cassette holder 2 and the guideways 11 and 8 in the frame 10.

Figure 2:
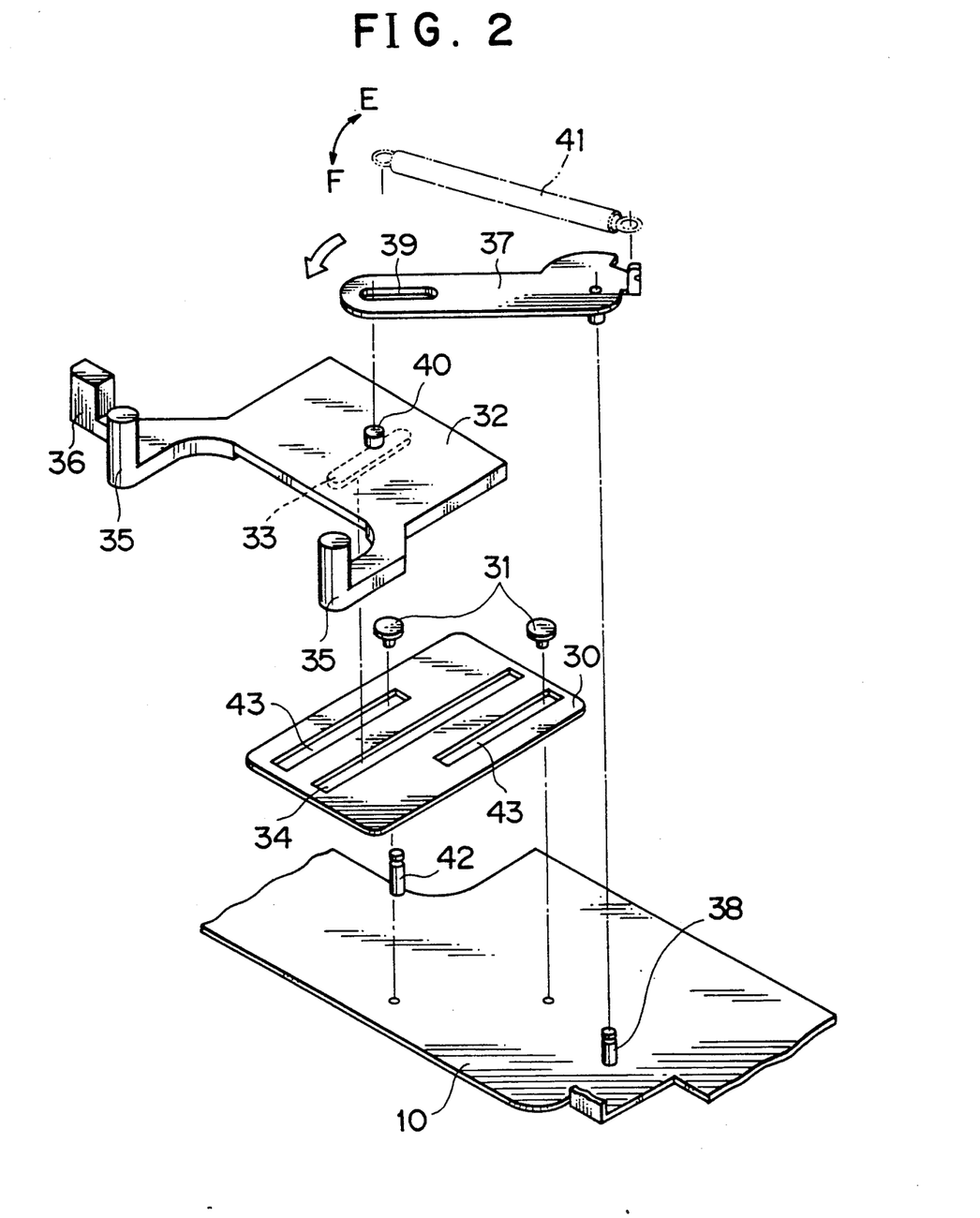
FIG. 2 is a fragmentary perspective view of several elements of the digital audio tape recorder shown in FIG. 1.

Referring now to FIG. 2, there is shown several parts of the digital audio tape recorder of FIG. 1 but in an inverted orientation. A slide plate 30 is mounted for movement on an upper face of the frame 10 (bottom face of the frame 10 in FIG. 1) under the guidance of a pair of guide pins 31 mounted on the upper face of the frame 10 and fitted for sliding movement in and along a pair of parallel guideways 43 formed in the slide plate 30. A slide lever 32 is placed in an overlapping relationship on the slide plate 30 and has a pin 40 formed on an upper face thereof. A pivotal lever 37 is mounted for pivotal motion around a first post 38 mounted on the frame 10 and overlies the slide lever 32. The pivotal lever 37 has a guideway 39 formed at an end portion thereof, and the pin 40 on the slide lever 32 extends through the guideway 39 of the pivotal lever 37. A center over spring 41 extends between a base end portion of the pivotal lever 37 and a second post 42 mounted on the upper face of the frame 10.

Figure 4:
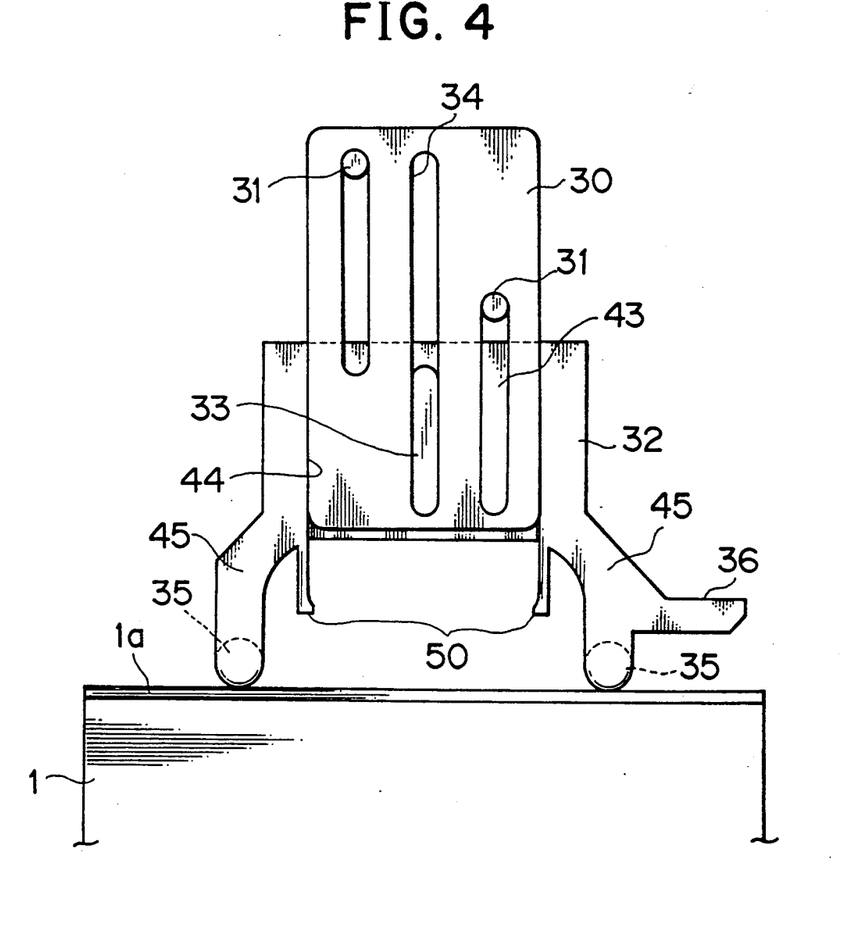
FIG. 4 is a plan view of part of the digital audio tape recorder shown in FIG. 1.
Figure 5:
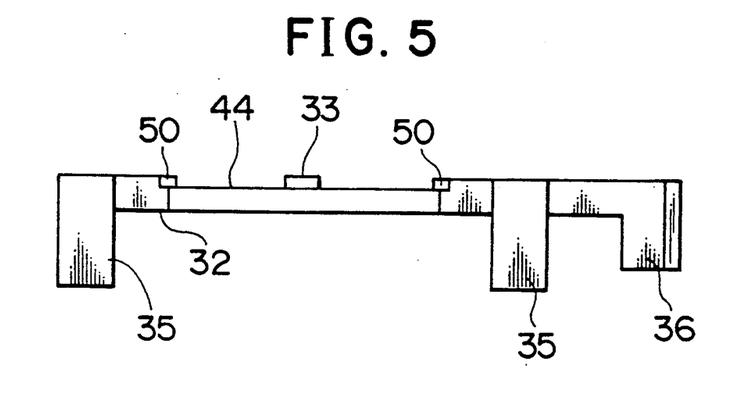
FIG. 5 is a front elevational view of a slide lever shown in FIG. 4.

Referring now to FIGS. 4 and 5, a wide groove 44 is formed on an upper wall (lower wall in FIG. 2) of the slide lever 32, and a guide projection 33 is formed on the bottom of the groove 44. The slide plate 30 is fitted for sliding movement in forward and backward directions, that is, in upward and downward directions in FIG. 4, in the groove 44 of the slide lever 32, and the guide projection 33 of the slide lever 32 is fitted for sliding movement in and along a slide hole 34 formed in parallel to the guideways 43 in the slide plate 30. The slide lever 32 further has a pair of pushing out fingers 35 formed at the front ends of a pair of forwardly extending arms 45 thereof for engaging with a cassette 1. A second arresting tab 36 extends sidewardly from one of the arms 45 for engaging with the first arresting portion 22 of the cassette holder 2. A pair of resilient engaging fingers 50 extend forwardly from the front end of the slide lever 32 adjacent the opposite sides of the groove 44 for resiliently engaging opposite side faces of the slide plate 30, as will be explained hereinbelow.

Figure 3A:
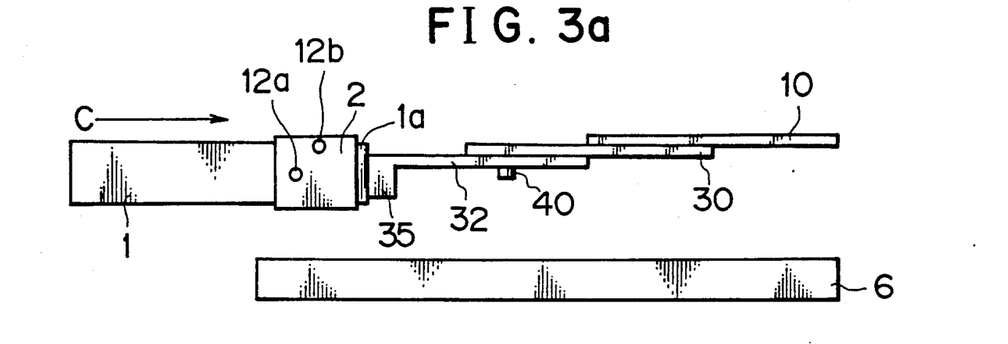
FIGS. 3a, 3b, 3c and 3d are schematic views showing a cassette holder at different positions in the digital audio tape recorder shown in FIG. 1.

In operation, when a cassette 1 is manually inserted into the cassette holder 2, it is contacted with the pushing out fingers 35 of the arms 45 of the slide lever 32, since the slide lever extends into a cassette loading path shown in FIGS. 3a-3d, and it is received in position into the cassette holder 2 as shown in FIGS. 3a and 4.

Figure 3B:
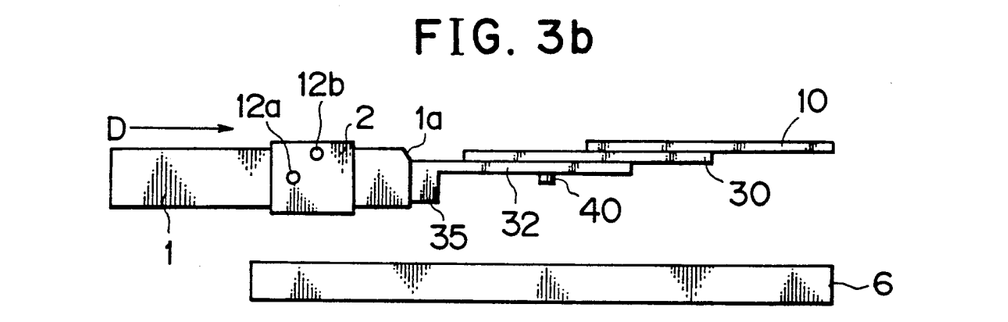
Figure 6:
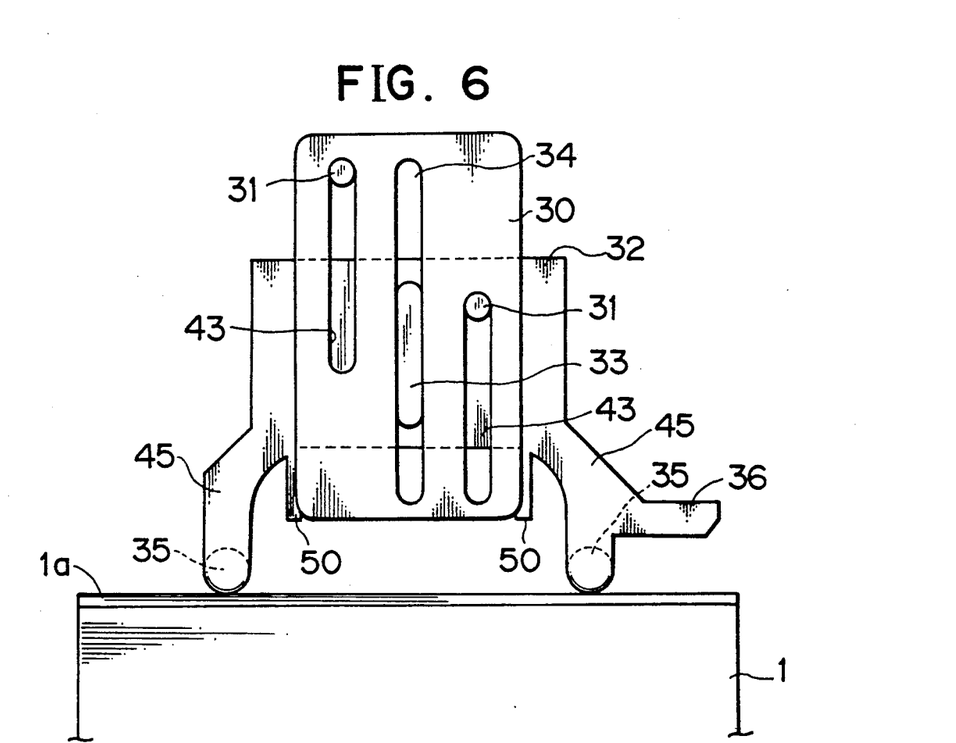
FIGS. 6 and 7 are views similar to FIG. 4 but showing the slide lever at different positions.

Then, when the cassette 1 is manually pushed further in the direction indicated by an arrow mark C in FIG. 3a with a force stronger than the force upon the preceding insertion of the cassette 1, the slide lever 32 is pushed by and moved together with the cassette 1 under the guidance of the guide projection 33 fitted in the slide hole 34 as seen in FIGS. 3b and 6 so that it operates a start switch not shown.

Figure 3C:
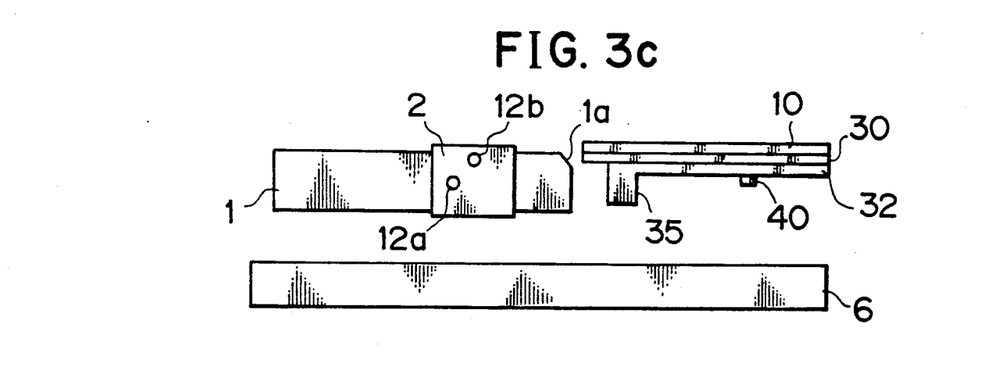
Figure 7:
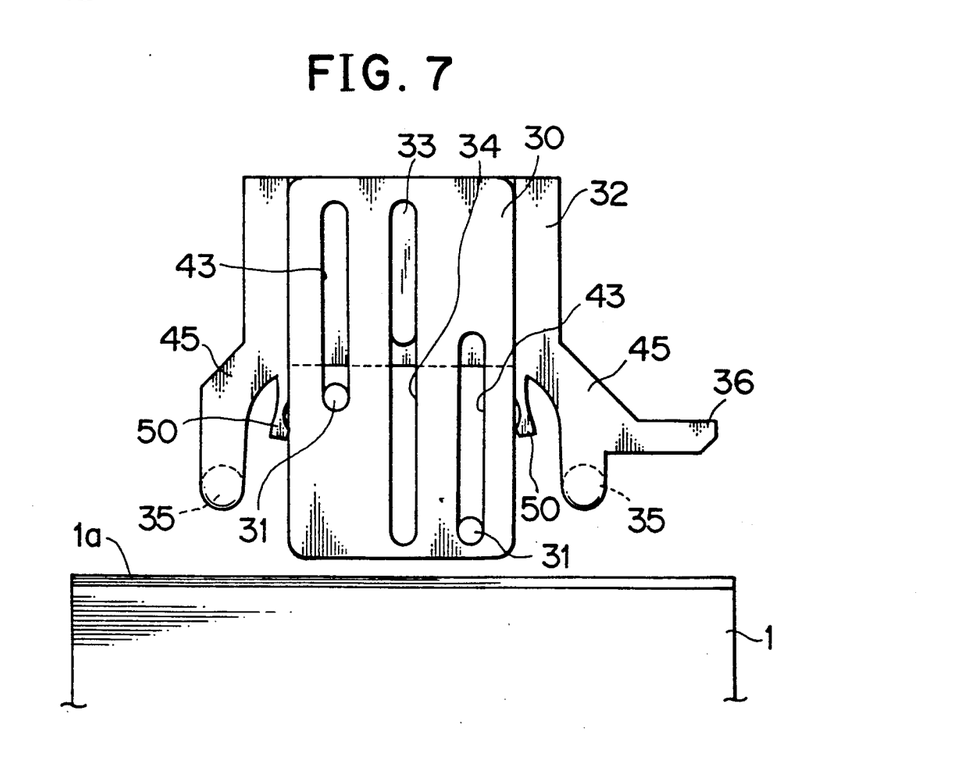

As a result of the operation of the start switch, the synchronizing gears 16 are rotated to rotate the arm gears 13. During such rotation of the arm gears 13, the guide pins 12a and 12b fitted in the guide holes 11 of the arm gears 13 are pushed by the arm gears 13 to move in and along the guide holes 11 of the frame 10, whereupon the cassette holder 2 and the cassette 1 are moved in an integral relationship in the direction indicated by an arrow mark D in FIG. 3b. Also the slide lever 32 is moved in the same direction to pivot the pivotal lever 37 in the direction indicated by an arrow mark E in FIG. 2 by way of the pin 40 on the slide lever 32 fitted in the guideway 39 in the pivotal lever 37. After the pivotal lever 37 is thus pivoted farther than a dead center line or toggle point of the center over spring 41, the slide lever 32 is now urged in the same direction by the center over spring 41 so that it is spaced away from the cassette 1. During such rearward movement of the slide lever 32 by the center over spring 41, the resilient engaging fingers 50 of the slide lever 32 resiliently engage with the opposite side faces of the slide plate 30 as seen in FIG. 6 so that the slide plate 30 is moved rearwardly in an integral relationship together with the slide lever 32. The slide plate 30 is thus moved until the guide pins 31 on the frame 10 are abutted with the front end faces of the guideways 43 of the slide plate 30 as seen in FIG. 7. After then, the slide lever 32 continues its rearward movement under the spring force of the center over spring 41 until the guide projection 33 thereon is abutted with the rear end face of the slide hole 34 of the slide plate 30 as shown in FIGS. 3c and 7. During such continued rearward movement of the slide lever 32, the resilient engaging fingers 50 thereon are yieldably deformed by the slide plate 30 and resiliently engaged with the opposite side faces of the slide plate 30 to hold the slide plate 30 in position with respect to the slide lever 32.

Figure 3D:
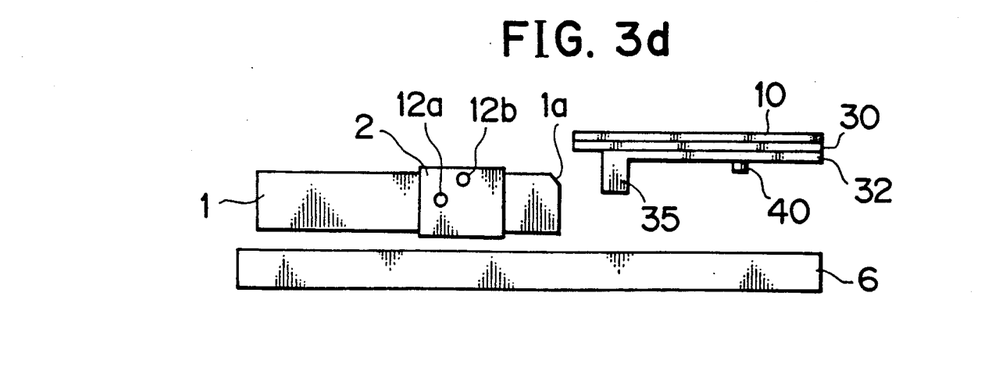

After then, the cassette 1 is moved downwardly to a predetermined playing position together with the cassette holder 2 as seen in FIG. 3d.

When the cassette 1 is to be moved reversely along the cassette loading path shown in FIGS. 3a–3d from the playing position shown in FIG. 3d to the cassette receiving position shown in FIGS. 3a and 4, the synchronizing gears 16 are driven to rotate reversely to move the cassette 1, cassette holder 2, slide plate 30 and slide lever 32 in the individually reverse directions to those described above. During such movement, the first arresting tab 22 of the cassette holder 2 which is moved by rotation of the arm gears 13 is engaged with the second arresting tab 36 of the slide lever 32 to push out the slide lever 32 toward the cassette receiving position. Upon such movement of the slide lever 32, the pivotal lever 37 is pivoted in the direction indicated by an arrow mark F in FIG. 2 by way of the pin 40 on the slide lever 32, and after the pivotal lever 37 is pivoted farther than the dead center line of the center over spring 41, the spring force of the center over spring 41 now urges the slide lever 32 back into the cassette loading path to push the cassette 1 to move in the direction opposite to the direction indicated by the arrow mark D in FIG. 3b until the cassette 1 comes to the cassette receiving position shown in FIG. 3a. At the cassette receiving position, the cassette 1 can be removed from the cassette holder 2 and another cassette 1 can be inserted instead.

It is to be noted that, where the slide lever 32 has no such resilient engaging fingers 50 as described above, the slide plate 30 will be moved, upon movement of a cassette 1 from the cassette receiving position to the cassette playing position described above, not by the slide lever 32 but by the cassette 1. When the slide plate 30 is pushed to move by the cassette 1, there is the possibility that, where the cassette 1 has a tapered portion 1a as seen in FIGS. 3a to 3d which may be provided to facilitate discrimination of a correct orientation of the cassette 1, the slide plate 30 may be engaged with and guided by the tapered portion of the cassette 1 and ride over an upper face of the cassette 1 to cause jamming of the slide plate 30 and the cassette 1 and hence hinder a normal cassette loading operation. The resilient engaging fingers 50 of the slide lever 32 are thus effective to prevent such possible trouble.

It is to be noted that, while in the embodiment described above the cassette loading device is incorporated in a digital audio tape recorder, the present invention can naturally be applied to some other apparatus which employs a cassette in which, for example, a magnetic disk, an optical disk or the like is accommodated. Further, while in the embodiment described above the single slide plate is interposed between the slide lever and the frame, a plurality of slide plates may otherwise be interposed for individual movement between the slide lever and the frame in order to further reduce a dimension necessary for the frame to guide the slide lever.

Having now fully described the invention, it will be apparent to one of ordinary skill in the art that many changes and modifications can be made thereto without departing from the spirit and scope of the invention as set forth herein.

What Is Claimed Is:

1. A cassette loading device for loading a cassette from a cassette receiving position to a cassette playing position along a cassette loading path, comprising:
   a frame;
   a cassette holder movably mounted on said frame to receive a cassette and carry the cassette between said cassette receiving position and said cassette playing position along said cassette loading path;
   a slide plate movably mounted on said frame; and
   a slide lever movably mounted on said slide plate such that said slide lever is movable into said cassette loading path to engage the cassette when the cassette is carried by said cassette holder in said cassette receiving position.

2. A cassette loading device as claimed in claim 1, wherein said slide lever includes resiliently engaging means for resiliently engaging with said slide plate upon movement of said slide lever when the cassette moves from said cassette receiving position to said cassette playing position.

3. A cassette loading device as claimed in claim 2, wherein said resiliently engaging means of said slide lever includes a pair of resilient fingers for resiliently engaging with opposite side faces of said slide plate upon movement of said slide lever.

* * * * *